Dec. 28, 1937.  J. H. ASHBAUGH  2,103,682
REFRIGERATION APPARATUS
Filed Nov. 3, 1934
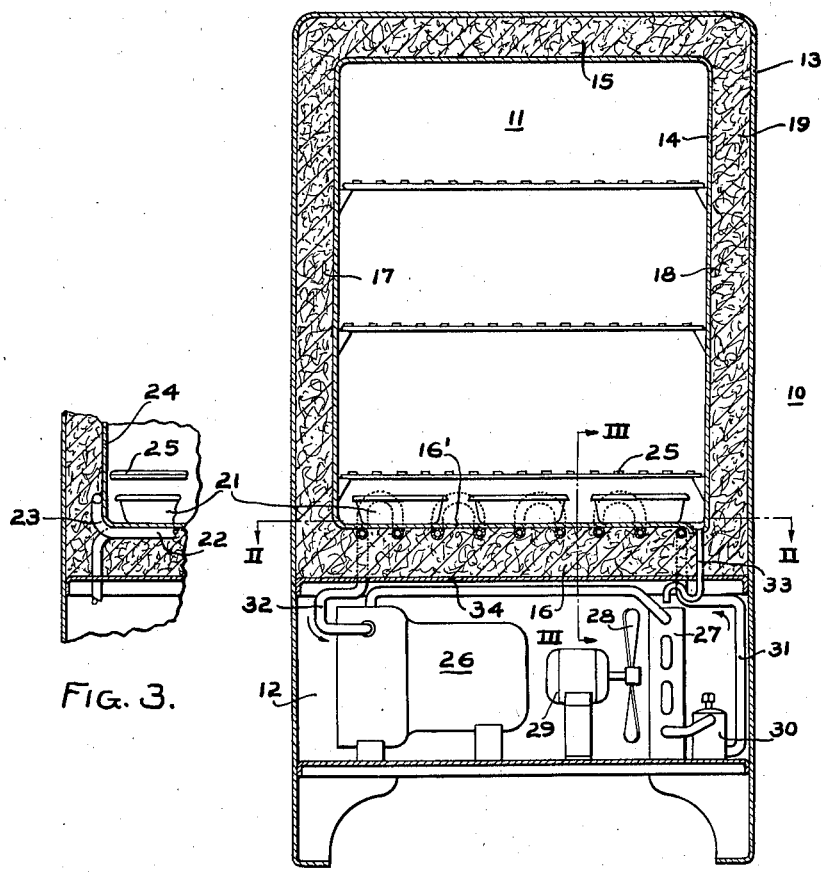
FIG. 1.
FIG. 3.
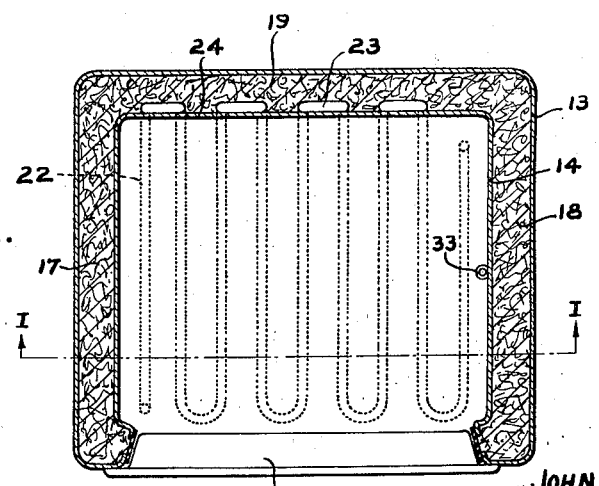
FIG. 2.
WITNESSES:
INVENTOR
JOHN H. ASHBAUGH.
BY
ATTORNEY Patented Dec. 28, 1937

2,103,682

UNITED STATES PATENT OFFICE 2,103,682

REFRIGERATION APPARATUS

John H. Ashbaugh, Springfield, Mass., assignor to Westinghouse Electric & Manufacturing Company, East Pittsburgh, Pa., a corporation of Pennsylvania Application November 3, 1934, Serial No. 751,309

4 Claims. (Cl. 62—116)

My invention relates to a refrigerator, particularly one of the household type adapted to refrigerate food and to congeal liquids, and it has for an object to provide an improved refrigerator.

Another object is to provide an improved refrigerator having a plurality of zones of different temperature.

A further object of my invention is to provide a refrigerator in which the conventional evaporator within the food storage compartment is eliminated, thereby increasing the usable food storage space and improving the appearance of the interior of the cabinet.

In accordance with my invention, I place the trays on the bottom wall portion of the food liner, and I provide said bottom wall portion with an evaporator or cooling element that cools the same to a sufficiently low temperature to congeal liquid in said trays. The food storage space above the trays is maintained in any suitable manner at a sufficiently low temperature for the preservation of food but preferably above the freezing point of water. In the preferred embodiment described herein, it is cooled by the same evaporator that congeals liquid in the trays.

These and other objects are effected by my invention, as will be apparent from the following description and claims, taken in accordance with the accompanying drawing, forming a part of this application, in which:

Fig. 1 is a vertical sectional view, taken on the line I—I of Fig. 2, showing one embodiment of my novel refrigerator;

Fig. 2 is a horizontal sectional view taken on the line II—II of Fig. 1; and

Fig 3 is a detail sectional view taken on the line III—III of Fig. 1.

Referring to the drawing in detail, I show a refrigerator cabinet 10 having a food compartment 11 and a machine compartment 12. The cabinet embodies an outer casing 13 and a food liner or inner casing 14 disposed therein with its wall portions in spaced relation to the respective wall portions of the outer casing 13, to form horizontal top and bottom walls, 15 and 16, respectively, and the vertical side and rear walls 17 and 18, respectively, of the food compartment 10. Heat insulating material 19, of any suitable kind, is preferably provided in the space between the respective wall portions of the outer casing and the food liner 14. The latter is preferably of metal having a coating of porcelain enamel or other suitable material, and the contiguous wall portions are preferably united to each other to form a unitary food liner. Breaker strips connect the edges of the food liner and the outer casing around the door opening in the front. A door 20 closes the door opening.

In accordance with the present invention, I place ice tray or trays for congealing liquid, shown at 21, on the bottom wall portion 16' of the food liner 14, and I cool said bottom wall portion to a temperature sufficiently low to congeal liquid in the trays 21. In the embodiment shown on the drawing, I provide an evaporator coil 22 on the under or lower surface of the bottom wall portion 16, preferably soldering the same thereto in order to provide good heat conductivity therebetween. As shown, each turn of the coil 22 extends substantially the full depth of the bottom wall portion, and there are sufficient turns to extend over substantially the entire width thereof, so that substantially the entire bottom wall portion is refrigerated. As shown at 23, the several turns of the evaporator coil 22 may be extended onto the back wall portion 24 of the food liner to a level even with the top of the trays 22. Shelves 25 are provided in the food liner in the food storage space above the trays 21.

The outer casing 13 is extended downwardly to provide the machine compartment 12, which contains a motor-compressor 26, a condenser 27, a fan 28, driven by a motor 29, for circulating air over the condenser, and a float valve 30. The refrigerating mechanism operates in the usual manner, compressed refrigerant being conveyed from the motor compressor 26 to the condenser 27 in which it is condensed, and then conveyed through the float valve 30 and a conduit 31 to the evaporator, and then returned through a conduit 32 to the motor compressor 26 to be recirculated. A drain pipe 33 is preferably provided for draining condensed moisture from the food liner and discharging the same onto the condenser 27 to be evaporated thereon in the current of air circulated thereover by the fan 28.

In the present embodiment, the evaporator 22 effects the refrigeration of both the trays and the space above the trays. It operates at a sub-freezing temperature sufficiently low to freeze water or to congeal other liquids in the trays 21. I have found that, with this arrangement, there is a stratum or blanket of very cold air adjacent the bottom of the food liner, this stratum extending approximately to the lowermost shelf 25 and providing a freezing temperature. The food space above the shelf 25 is refrigerated but at a higher temperature than that in the lower zone in which the trays 21 are located, and which temperature is preferably above the freezing point of water. A fairly sharp difference in temperature between the two zones can be maintained for the reason that the trays 21, which are preferably of metal and rest directly on the intensely refrigerated bottom wall portion 16', are in better heat-transfer relation to the evaporator 22, whereas the food storage space above the trays depends upon conduction through the wall portions of the food liner 14 and through the air, and upon radiation from said space to the bottom wall portion 16' and to the ice trays 22 for its cooling.

A greater spacing and thickness of insulation is preferably provided between the bottom wall portion 16 and the bottom wall portion 34 of the outer casing, due to the lower temperature of the former.

It is to be understood that, when it is desired to cool an article of food to a lower temperature than usual, one or more of the trays may be removed, and the lower portion of the cabinet used as a low temperature food storage compartment.

While in the above embodiment, the food storage space above the trays is refrigerated by the same evaporator that refrigerates the ice trays, the broad invention is not so limited, but contemplates any suitable means for maintaining the same at a temperature sufficiently low for the preservation of food.

It will thus be seen that I provide a refrigerator of the type known as a two-temperature refrigerator, in which there is one zone having a sufficiently low temperature for the congealing of liquids and a second zone having a higher temperature above freezing for the preservation of food. It will also be noted that I have provided such two-temperature refrigerator by simple and inexpensive apparatus, and that I have provided the same without any evaporator inside of the food liner of the cabinet.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a household refrigerator, the combination of a cabinet including an outer casing, an inner metallic casing or food liner having a plurality of wall portions disposed in spaced relation to and heat insulated from the respective wall portions of the outer casing and including a bottom wall portion, trays for congealing liquids supported on said bottom wall portion, means including an evaporator on the underside of said bottom wall portion for maintaining a sub-freezing temperature of said wall portion and for maintaining a refrigerated temperature above freezing in the upper portion of the food liner, said last-mentioned means including means for circulating a volatile refrigerant through the evaporator and vaporizing the same therein at a pressure and temperature sufficiently low to freeze water in said trays, and shelves mounted in said food liner above said ice trays.

2. In a refrigerator, the combination of a cabinet having a food liner therein, said food liner having vertical side and rear wall portions and top and bottom wall portions, a tray for congealing liquid resting directly on said bottom wall portion in intimate heat conducting relation thereto, said food liner providing a food storage space above said tray, and an evaporator disposed on the under side of said bottom wall portion and extended onto one of said vertical wall portions to a level even with the top of said tray, said evaporator being effective to cool said bottom wall portion to a temperature sufficiently low to congeal liquid in said tray, and said food storage space being cooled to a temperature sufficiently low for the preservation of food but above the freezing point of water.

3. In a refrigerator, the combination of a cabinet having a food liner therein, said food liner having vertical side and rear wall portions and top and bottom wall portions, a tray for congealing liquid resting directly on said bottom wall portion in intimate heat conducting relation thereto, said food liner providing a food storage space above said tray, and an evaporator disposed on the underside of said bottom wall portion and extended onto one of said vertical wall portions to a level even with the top of said tray, said evaporator being effective to cool said bottom wall portion to a temperature sufficiently low to congeal liquid in said tray and to cool said food storage space to a temperature sufficiently low for the preservation of food but above the freezing point of water.

4. In a refrigerator, the combination of a cabinet having a metallic food liner therein, said food liner having vertical side and rear wall portions and top and bottom wall portions, a tray for congealing liquid resting directly on said bottom wall portion in intimate heat conducting relation thereto, said food liner providing a food storage space above said tray, and an evaporator disposed wholly below a level substantially even with the top of said tray and in intimate heat conducting contact with the under side of said bottom wall portion, said evaporator being effective to cool said bottom wall portion to a temperature sufficiently low to congeal liquid in said tray and to cool said food storage space to a temperature sufficiently low for the preservation of food but above the freezing point of water, the cooling of the food storage space by said evaporator being effected at least in part by conduction of heat through the vertical and bottom wall portions of the metallic food liner.

JOHN H. ASHBAUGH.